United States Patent
Chen et al.

(10) Patent No.: US 10,509,774 B2
(45) Date of Patent: Dec. 17, 2019

(54) SECURE CONTAINERIZED USER SPECIFIC ISOLATED DATA STORAGE

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 221 days.

(21) Appl. No.: 15/619,101

(22) Filed: Jun. 9, 2017

(65) Prior Publication Data

US 2018/0357447 A1 Dec. 13, 2018

(51) Int. Cl.

| G06F 17/30 | (2006.01) |
|---|---|
| G06F 16/21 | (2019.01) |
| G06F 11/14 | (2006.01) |
| G06F 21/53 | (2013.01) |
| G06F 21/62 | (2013.01) |
| H04L 29/08 | (2006.01) |
| H04L 29/06 | (2006.01) |

(52) U.S. Cl.
CPC ........ *G06F 16/211* (2019.01); *G06F 11/1464* (2013.01); *G06F 21/53* (2013.01); *G06F 21/6218* (2013.01); *H04L 63/08* (2013.01); *H04L 67/1097* (2013.01); *G06F 2201/80* (2013.01)

(58) Field of Classification Search
CPC ........ G06F 16/211; G06F 21/53; G06F 21/60; G06F 21/602; G06F 21/6218; G06F 21/6245; G06F 21/6254; G06F 11/1464; G06F 2201/80; G06F 2201/08; H04L 63/10

See application file for complete search history.

(56) References Cited

U.S. PATENT DOCUMENTS 9,288,053 B2 3/2016 Dutta et al.
9,417,917 B1 8/2016 Barber et al.
(Continued)

OTHER PUBLICATIONS

Getting Started With Containers; May 6, 2017; https://access.redhat.com/documentation/en-us/red_hat_enterprise_linux_atomic_host/7/html-single/getting_started_with_containers/#building_container_images_with_standard_base_images (49 pp.).
(Continued)

*Primary Examiner* — Greta L Robinson
(74) *Attorney, Agent, or Firm* — K&L Gates LLP

(57) ABSTRACT

Secure containerized user specific isolated data storage is disclosed. For example, a first isolated guest is instantiated, including a first account specific database with a write-protected schema, a write-protected first lower storage layer and a first upper storage layer. A first account is authenticated with the first isolated guest. A first change to the first account specific database is saved in the first upper storage layer based on executing a first database command from the first account. A second isolated guest is instantiated, including a second account specific database with the write-protected schema, a write-protected second lower storage layer and a second upper storage layer. The second account is authenticated with the second isolated guest. A second change to the second account specific database is saved in the second upper storage layer based on executing the second database command from the second account.

20 Claims, 6 Drawing Sheets

(56) References Cited

U.S. PATENT DOCUMENTS

| | | | | |
|---|---|---|---|---|
| 2004/0210713 A1* | 10/2004 | Kanai | ............... | G06F 3/0607 |
| | | | | 711/113 |
| 2011/0173251 A1* | 7/2011 | Sandhu | ............... | G06F 8/61 |
| | | | | 709/203 |
| 2011/0307486 A1* | 12/2011 | Breslau | ............... | G06F 21/6245 |
| | | | | 707/737 |
| 2012/0304283 A1* | 11/2012 | Beam | ............... | G06F 9/468 |
| | | | | 726/17 |
| 2015/0058568 A1* | 2/2015 | Fong | ............... | G06F 12/128 |
| | | | | 711/122 |
| 2015/0278243 A1* | 10/2015 | Vincent | ............... | G06F 16/182 |
| | | | | 707/634 |
| 2015/0339667 A1* | 11/2015 | Dua | ............... | G06Q 20/20 |
| | | | | 705/16 |

OTHER PUBLICATIONS

Create Cloud Files Container—Level Access Control Policies; Mar. 27, 2014; by Rack Slogger; (7 pp.).

Microservices in Practice; Nov. 28, 2015; http://kasunpanorama.blogspot.in/2015/11/microservicesinpractice.html; (26 pp.).

Getting Started with IBM Object Storage for Bluemix; Oct. 20, 2015; by Dharmesh Bhakta; https://www.ibm.com/blogs/bluemix/2015/10/gettingstartedwithbluemixobjectstorage/ (13 pp.).

* cited by examiner

SECURE CONTAINERIZED USER SPECIFIC ISOLATED DATA STORAGE

BACKGROUND

The present disclosure generally relates to providing secure storage for user data. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the containers are capable of performing individually. In an example, a container and/or a cluster of containers may be implemented specifically to execute certain specific tasks and/or types of tasks. A scheduler may be implemented to allocate containers and clusters of containers to a host, the host being either a physical host or a virtual host such as a virtual machine. Typically, a container is significantly lighter weight than a virtual machine, and may be hosted in a virtual machine, allowing for additional flexibility and scalability of deployment.

SUMMARY

The present disclosure provides a new and innovative system, methods and apparatus for secure containerized user specific isolated data storage. In an example, a database schema provider is associated with a schema compatible with a plurality of databases. A processor is communicatively coupled with a memory, on a system with a plurality of accounts including different first and second accounts. A first isolated guest is instantiated, including a first account specific database on the first isolated guest. The first account specific database is a database of the plurality of databases and the first isolated guest includes at least a first lower storage layer that is write-protected and a first upper storage layer. The schema is added to the first account specific database, where the schema is write-protected. A first database command is received from the first account. The first account is authenticated with the first isolated guest. A first change to the first account specific database is saved in the first upper storage layer based on executing the first database command. A second isolated guest is instantiated, including a second account specific database on the second isolated guest. The first account specific database is a database of the plurality of databases and the second isolated guest includes at least a second lower storage layer that is write-protected and a second upper storage layer. The schema is added to the second account specific database, where the schema is write-protected. A second database command is received from the second account. The second account is authenticated with the second isolated guest. A second change to the second account specific database is saved in the second upper storage layer based on executing the second database command.

Additional features and advantages of the disclosed method and apparatus are described in, and will be apparent from, the following Detailed Description and the Figures.

DETAILED DESCRIPTION OF EXAMPLE EMBODIMENTS

Figure 1:
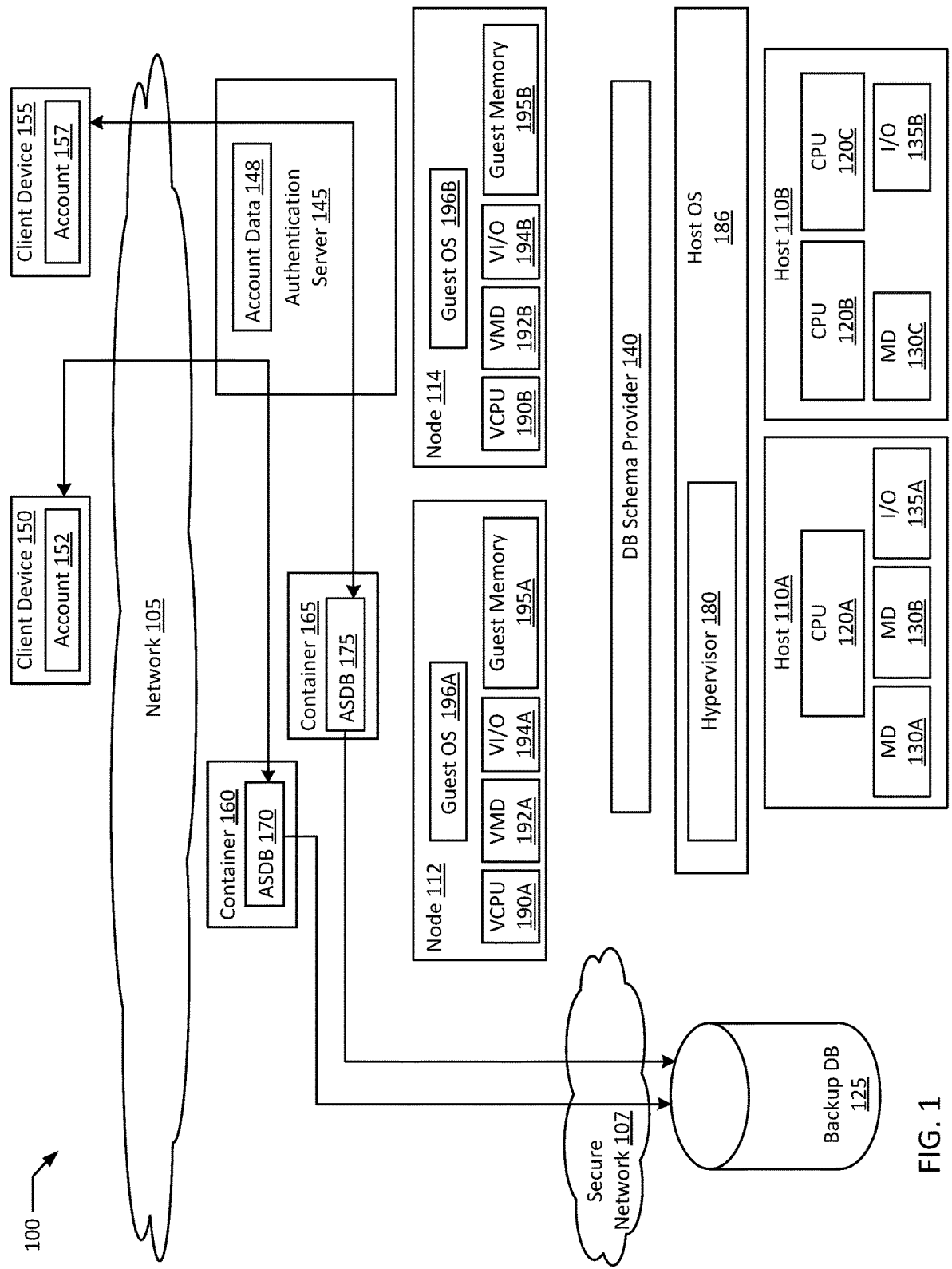
FIG. 1 is a block diagram of a secure containerized user specific isolated data storage system according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and clean-ups with low latency. Containers may allow wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. In an example, a physical and/or virtual host nodes may host hundreds of containers, each of which may independently execute tasks.

In many network applications, such as those hosted on containers in multi-tenant clouds, account specific data may be required at some point in a task performed by the network application. For example, an e-commerce website may have user information such as payment and address information. Additional information such as shopping carts etc. may also be stored in the database. Alternatively, an e-mail application may have many e-mails stored for the user. In a typical example, user specific data may be stored in one or more databases accessed by an application performing a user requested task. Typically, databases may be organized by functionality, with data from many users stored in the same shared database. An application is typically provided sufficient rights to access the user specific information of any account that may use the application. In some examples, the direct access by the application to a shared database may provide a route by which a security breach of one user account spreads dramatically in impact. In an example, an exploited security vulnerability of one user account may allow for the theft of an entire database worth of information including user specific information for many accounts. However, shared database architecture is often mandated by scalability concerns. Typically, databases require significant processing and storage overhead to run at required performance levels, and therefore sharing a database among many user accounts may be an efficiency driven requirement that creates a necessary security risk.

The present disclosure aims to address existing security challenges presented by shared databases storing user specific information by enabling secure containerized user specific isolated data storage. In an example, an isolated guest, such as a container, may be constructed to execute a light weight copy of a database. The core components of the container stored in an image file from which copies of the container may be launched may be constructed to include all of the required components to launch an independent database instance. In an example, launching a separate copy of such a container for each user may still be an unsustainable amount of required overhead for many network applications. However, through the use of, for example, a multi-layered file system such as OverlayFS, the image file from which the container is launched may be saved as a lower storage layer that is write-protected and shared by each copy of the container launched from the same physical host. In the example, any modifications to any files included in the image file by the various executing containers may copy-on-write and save an alternative, specialized copy in a container specific upper storage layer. In the example, each user's user specific data may occupy a small fraction of the storage space required for the image file and core database components. Therefore, for example, storing one hundred executing copies of the container may require only less than double the space of one executing copy of the container. Similarly, shared libraries stored in memory may likely be identical between the various copies of containers allowing for very high container density in memory as well. Memory sharing through copy-on-write operations enables sharing memory resources between containers on the same physical host, and therefore enables deploying multiple individual containers each with a copy of a database on the same hardware with a relatively low memory overhead. Each of these databases may then be assigned to a specific account as an account specific database hosted on an account specific database container. In addition, because each account specific database container only requires processing resources when the data in that account specific database is being accessed, the majority of the additional overhead for launching separate containers to compartmentalize user specific data into separate containerized databases may be limited to the overhead of containerization process itself.

In an example, by isolating user specific data into separate database instances on separate containers, damage from any given security breach may be greatly limited. For example, account specific authentication may be required each time an account specific database container is accessed for data (e.g., payment information) used by an application (e.g., a payment service). In such an example, a security breach of one user account's credentials would not grant access to any other user's data, because rather than the application using elevated rights to access a shared database with many users' data, data access is restricted at the database host (e.g., container) level by an account specific authentication process. Therefore, the application no longer requires elevated database access rights to view all records of payment information for all possible users, and no longer presents a route through which millions of accounts' information may be stolen.

FIG. 1 is a block diagram of a secure containerized user specific isolated data storage system according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, hosts 110A-B may run one or more isolated guests, for example, containers 160 and 165, and nodes 112 and 114. In an example, any of containers 160 and 165 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, nodes 112 and 114 may be VMs executing on hosts 110A-B. In an example, containers 160 and 165 may execute on node 112. In an example, authentication server 145 may execute either independently or within a container on node 114. In an example, any of containers 160 and 165 may be executing directly on either of hosts 110A-B without a virtualized layer in between. In an example, isolated guests may be further nested in other isolated guests. For example, VMs (e.g., nodes 112 and 114) may host containers (e.g., containers 160 and 165). In addition, containers and/or VMs may further host other guests necessary to execute their configured roles. For example, a VM (e.g., node 112 and 114) and/or a container (e.g., container 160 and 165) may further host a Java® Virtual Machine ("JVM") if execution of Java® code is necessary.

System 100 may run one or more VMs (e.g., nodes 112 and 114), by executing a software layer (e.g., hypervisor 180) above the hardware and below the nodes 112 and 114, as schematically shown in FIG. 1. In an example, the hypervisor 180 may be a component of a host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to nodes 112 and 114 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OS 186 without an intervening layer of virtualization.

In an example, a node 112 may be a virtual machine and may execute a guest operating system 196A which may utilize the underlying VCPU 190A, VIVID 192A, and VI/O 194A. One or more isolated guests (e.g., containers 160A-D) may be running on node 112 under the respective guest operating system 196A. Processor virtualization may be implemented by the hypervisor 180 scheduling time slots on one or more physical processors 120A-C such that from the guest operating system's perspective those time slots are scheduled on a virtual processor 190A.

Node 112 may run on any type of dependent, independent, compatible, and/or incompatible applications on the underlying hardware and host operating system 186. In an example, containers 160 and 165 running on node 112 may be dependent on the underlying hardware and/or host operating system 186. In another example, containers 160 and 165 running on node 112 may be independent of the underlying hardware and/or host operating system 186. In an example, containers 160 and 165 running on node 112 may be compatible with the underlying hardware and/or host operating system 186. Additionally, containers 160 and 165 running on node 112 may be incompatible with the underlying hardware and/or OS. The hypervisor 180 may manage memory for the host operating system 186 as well as memory allocated to the node 112 and guest operating system 196A such as guest memory 195A provided to guest OS 196. In an example, authentication server 145 may be an application executing on node 114. In another example, authentication server 145 may be hosted in a container executing on node 114. Authentication server 145 may also execute directly on physical hardware (e.g., hosts 110A-B). In an example, image files providing the core functional components of containers 160 and 165 may be stored on guest memory 195A, while similar executable and configuration files for authentication server 145 may be stored in guest memory 195B. Similarly, database ("DB") schema provider 140 may be an application executing on host OS 186 or DB schema provider 140 may be virtualized (e.g., executing on guest OS 196A). In an example, DB schema provider 140 assigns a canonical schema to account specific databases 170 and 175. In an example, account specific databases ("ASDB") 170 and 175 may store data in guest memory 195A. In another example, ASDBs 170 and 175 may store data in a separate persistent storage, for example, across a network (e.g., network 105, secure network 107) from node 112. Similarly, account data 148 may be stored in guest memory 195B or in a separate detached storage.

In an example, network 105 may be any form of suitable network for allowing communications between computing devices, for example, a public network (e.g., the Internet), a private network (e.g., a local area network (LAN) or wide area network (WAN)), or a combination thereof. In an example, secure network 107 may be a similar network to network 105, however, devices within secure network 107 may be isolated from public networks (e.g., the Internet), by a layer of devices operating as a firewall. In an example, a layer of devices (e.g., routers, switches, servers) constituting a "de-militarized zone" ("DMZ") may isolate secure network 107 from directly interfacing with network 105. In an example, client devices 150 and 155 may be any form of network accessible device (e.g., phone, tablet, laptop, desktop, server, Internet of Things ("IOT") device, etc.). In the example, an account associated with each client device (e.g., accounts 152 and 157 associated with client devices 150 and 155 respectively) may authenticate with authentication server 145 prior to connecting to an assigned account specific database (e.g., ASDB 170 and 175) on a respective container (e.g., containers 160 and 165).

In an example, ASDBs 170 and 175, as well as backup DB 125 may be any form of suitable database, for example a relational database. The ASDBs 170 and 175, and/or backup DB 125 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, ASDBs 170 and 175, and/or backup DB 125 may be stored in a database organized as a formal database with a schema such as a relational schema with defined tables, indices, links, triggers, various commands etc. In some examples, ASDBs 170 and 175, and/or backup DB 125 may not be organized as a formal database, but may instead be an alternative storage structure capable of holding the information stored in ASDBs 170 and 175, and/or backup DB 125, including but not limited to a file, folder, directory, registry, array, list, etc.

Figure 2A:
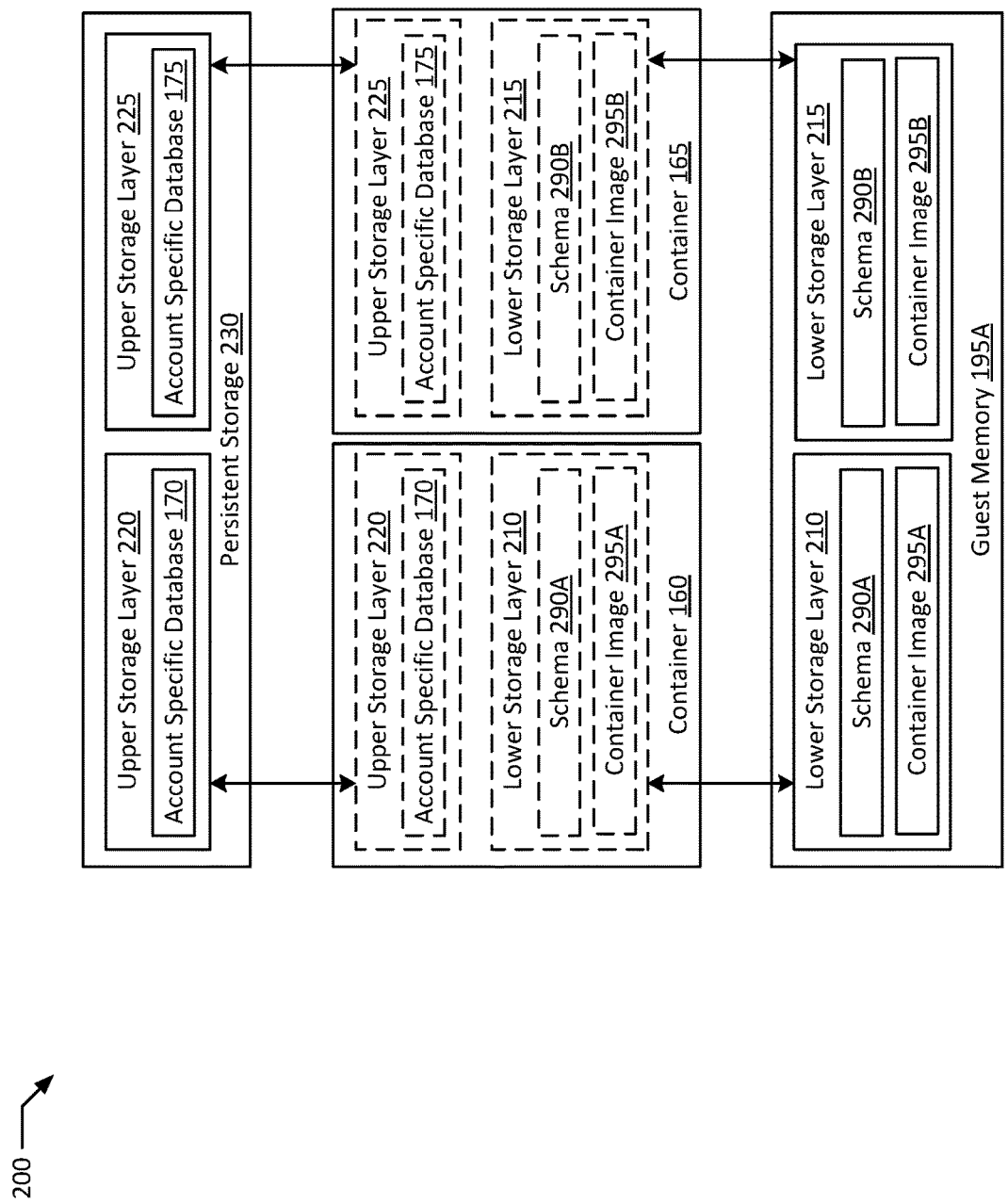
FIG. 2A is a block diagram illustrating a secure containerized user specific isolated data storage system with persistent storage attached according to an example of the present disclosure.

FIG. 2A is a block diagram illustrating a secure containerized user specific isolated data storage system with persistent storage attached according to an example of the present disclosure. In a typical example where containers (e.g., container 160 and 165) are launched on multi-layered file systems such as those enabled by OverlayFS, at least one lower storage layer (e.g., lower storage layers 210 and 215) and one upper storage layer (e.g., upper storage layers 220 and 225) are created. In the example, a lower storage layer (e.g., lower storage layers 210 and 215) may typically be configured to be write-protected, and may include core system files. Conversely, an upper storage layer (e.g., upper storage layers 220 and 225) may be configured to allow write access to the executing container. In a typical example, lower and upper storage layers may all be stored in local storage (e.g., guest memory 195A) on the host of the container (e.g., node 112 hosting containers 160 and 165). Typically, local storage may be accessed faster and may therefore provide performance advantages. However, containers tend to be short lived and cleaned up when their tasks are finished executing. Upper storage layers (e.g., upper storage layers 220 and 225) are typically configured to be stored in temporary scratch space. Therefore, storing a user's account specific database (e.g., ASDB 170 and 175) in an upper storage layer may result in data loss if container 160 and/or container 165 were to terminate for whatever reason.

In an example as illustrated by system 200, by enabling individual storage layers to be stored on separate storage devices (e.g., guest memory 195A vs. persistent storage 230), performance and capacity improvements may be realized. In an example, lower storage layer 210 may be created in guest memory 195A for container 160 for higher performance. In addition, where container 160 and 165 are created from identical base images, lower storage layer 210 may include identical information to lower storage layer 215, and therefore may be configured to be deduplicated on guest memory 195A, with only one copy physically stored shared between containers 160 and 165. In the example, container images 295A and 295B may be copies of the same container image. In an example, schema 290A and schema 290B may also be copies of the same schema. In an example, schema 290A may be a part of container image 295A. In another example, schema 290A may be added to lower storage layer 210, for example, by DB schema provider 140, after container 160 is launched. In an example, lower storage layers 210 and 215 are write-protected and/or immutable. In the example, lower storage layers 210 and 215 may be fungible, and containers 160 and 165 may substitute a copy of container image 295A and schema 290A on another memory (e.g., guest memory 195B) for lower storage layers 210 and/or 215. In an example, upper storage layers 220 and 225 may include data generated during the execution of containers 160 and 165, and may therefore be different from each other. In an example, upper storage layers 220 and 225 may be stored in a persistent storage 230. In the example, persistent storage 230 may be a high availability and/or high performance memory device, for example, a storage area network (SAN) or network attached storage (NAS) device. In an example, data in persistent storage 230 may be replicated preventing the loss of any one device and/or location (e.g., datacenter) from causing a total loss of data (e.g., upper storage layers 220 and 225). In an example, by hosting upper storage layer 220 on persistent storage 230, container 160 may be migrated from node 112 to any other host by copying container image 295A and schema 290A to a new physical or virtual host to create a new lower storage layer identical to lower storage layer 210.

Figure 2B:
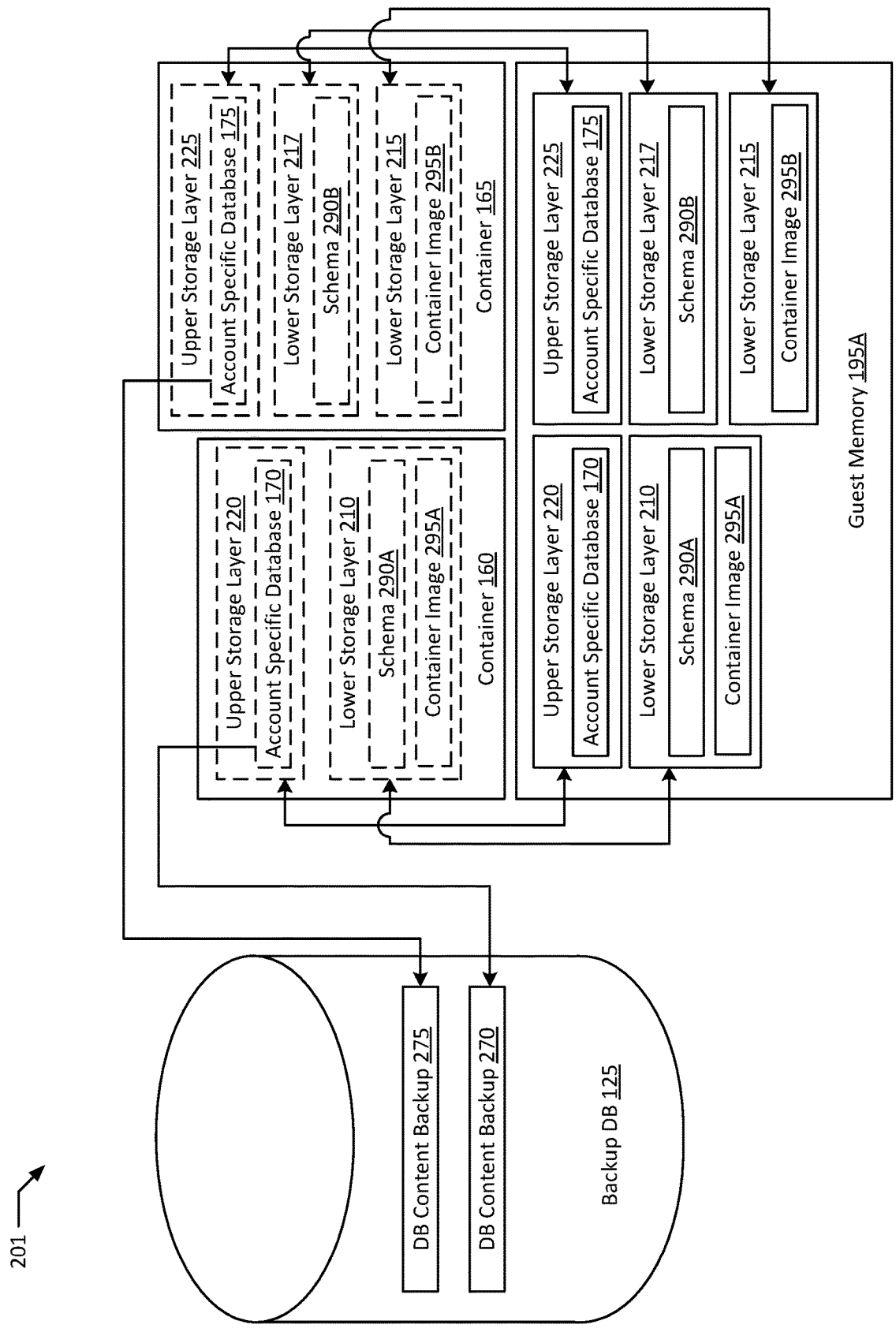
FIG. 2B is a block diagram illustrating a secure containerized user specific isolated data storage system with secure backup storage attached according to an example of the present disclosure.

FIG. 2B is a block diagram illustrating a secure containerized user specific isolated data storage system with secure backup storage attached according to an example of the present disclosure. In an example, system 201 illustrates an alternative embodiment of system 200 for preventing data loss and for providing data persistence to upper storage layers 220 and 225. In an example, the systems 200 and 201 are not mutually exclusive and beneficial features from both may be freely combined. In an example, containers 160 and 165 are hosted on node 112 with a multi-layered file system such as OverlayFS. In the example, lower storage layers (e.g., lower storage layers 210, 215, and 217 are configured to be write-protected with respect to containers 160 and 165. In an example, container 160 may include two storage layers, upper storage layer 220 and lower storage layer 210. In the example, both upper storage layer 220 and lower storage layer 210 may be stored on guest memory 195A. Upper storage layer 220 may include account specific database 170 in addition to storage space for saving other modified files for container 160 (e.g., temporary files). Lower storage layer 210 may include schema 290A and container image 295A which may be write-protected. In an example, schema 290A may be included in container image 295A. In another example, schema 290A may be added to lower storage layer 210 while container 160 is being instantiated.

In an example, container 165 may be another copy of a container launched from the same container image as container 160. In the example, container image 295B saved in lower storage layer 215 may be identical to container image 295A. In an example, lower storage layer 215 may be assigned to an account with container orchestrator rights, while a second lower storage layer 217 may be created for DB schema provider 140. In the example, DB schema provider 140 may then add schema 290B to container 165 in lower storage layer 217 while still ensuring that schema 290B is in a write-protected lower storage layer. In an example, the contents of the combined lower storage layers 215 and 217 may be functionally interchangeable to lower storage layer 210 as far as containers 160 and 165 are concerned. Upper storage layer 225 storing account specific database 175 may also be stored in guest memory 195A.

In an example, the contents of ASDBs 170 and 175 may be periodically backed up on backup DB 125 through secure network 107. In the example, DB content backup 275 may be a backup of the data in ASDB 175, while DB content backup 270 may be a backup of the data in ASDB 170. In illustrated system 201, backup DB 125 may serve multiple roles, for example, DB content backup 270 may be utilized to restore relatively up to date data to ASDB 170 if container 160 and/or guest memory 195A experience an outage. In such an example, ASDB 170 may be moved to a new container on a new host and/or node. In addition, backup DB 125 may be configured to be the only source where the data from every ASDB (e.g., ASDBs 170 and 175) may be accessed together. In the example, backup DB 125 may allow batch analytics to be performed across a unified database and data set to analyze trends in the data. For example, if ASDBs 170 and 175 include application error reports for two separate users, backup DB 125 may be used to discover trends and correlations in the error reports, to discover potential triggers for errors in the application. In an example, as the number of users and accounts scales higher, the odds of finding correlations through data analytics may increase. In an example, backup DB 125 may be queried for general user trends where individual users request for their activities to remain anonymous. In such an example, data in backup DB 125 may first be anonymized prior to analysis, either on DB 125 or in a separate anonymized analysis database. In an example, only backup DB 125 behind secure network 170 may access each ASDB in system 201. Other components, such as the application using ASDBs 170 and 175 may only access data from an ASDB where the application user is currently authenticated. In an example, backup DB 125 may lack direct interfaces to unsecured networks. For example, a gateway system with multiple network interfaces may be implemented as part of a firewall between backup DB 125 and ASDBs 170 and 175, where the gateway system has dedicated secure network interfaces facing secure network 107 and separate network interfaces facing network 105. In an example, for added security, ASDBs 170 and 175 (and therefore containers 160 and 165) may also be hosted behind secure network 107. However, the added layer of security may provide limited value where data breaches are limited to single accounts, and the additional latency overhead from the extra layer of security may be balanced against the security benefits.

In an example, backup DB 125 may primarily provide disaster recovery backup functionality for ASDBs 170 and 175. In such an example, DB content backups 270 and 275 may be encrypted in backup DB 125. In an example, DB content backups 270 and 275 may be encrypted together by a method that backup DB 125 may decrypt. In another example, DB content backups 270 and 275 may be separately encrypted, for example with account specific encryption keys that can only be individually decrypted after successful authentication by the specific account the data belongs to. In an example, backup DB 125 may be implemented in conjunction with storing upper storage layers 220 and 225 on a remote persistent storage, for example, where data backups are especially important and/or where batch analytics may be required. In an example, DB content backup 270 may be used to restore a recent copy of the data in ASDB 170. For example, if ASDB 170 somehow becomes corrupted, DB content backup 270 may be used to restore an earlier, pre-corruption state. In an example, if node 112 is brought down for maintenance, a new container may be constructed, for example by copying container image 295A and schema 290A to node 114, and the new container may be used to host a new ASDB restored from DB content backup 270.

In an example, access to ASDBs may be limited to the account assigned to the ASDB identified by an account identifier (e.g., UID). In various examples, trade offs between security and access may be made. For example, an ASDB may be assigned to one or more groups in addition to an account identifiable by a group identifier (e.g., GID). In an example, a first account may be assigned to ASDB 170. In the example, the first account may belong to a first user group, including other accounts, such as multiple users in the same family having separate accounts to an e-commerce website. In such an example, user specific data may be saved (e.g., for recommendations) but payment methods may be shared among the users in the group, so a second member of the family connecting to the site may still access ASDB 170 or a separate shared payment ASDB for payment purposes.

In an example, an administrator group may be configured with wide reaching access, for example, sufficient access to execute backups to backup DB 125. In the example, an administrator account may be permissioned to execute, for example, a SELECT command on each ASDB in system 201. In an example, the administrator account may be restricted to accessing ASDBs from within secure network 107 and may be restricted from use by applications thereby reducing the potential security implications of the existence of the administrator account.

Figure 3:
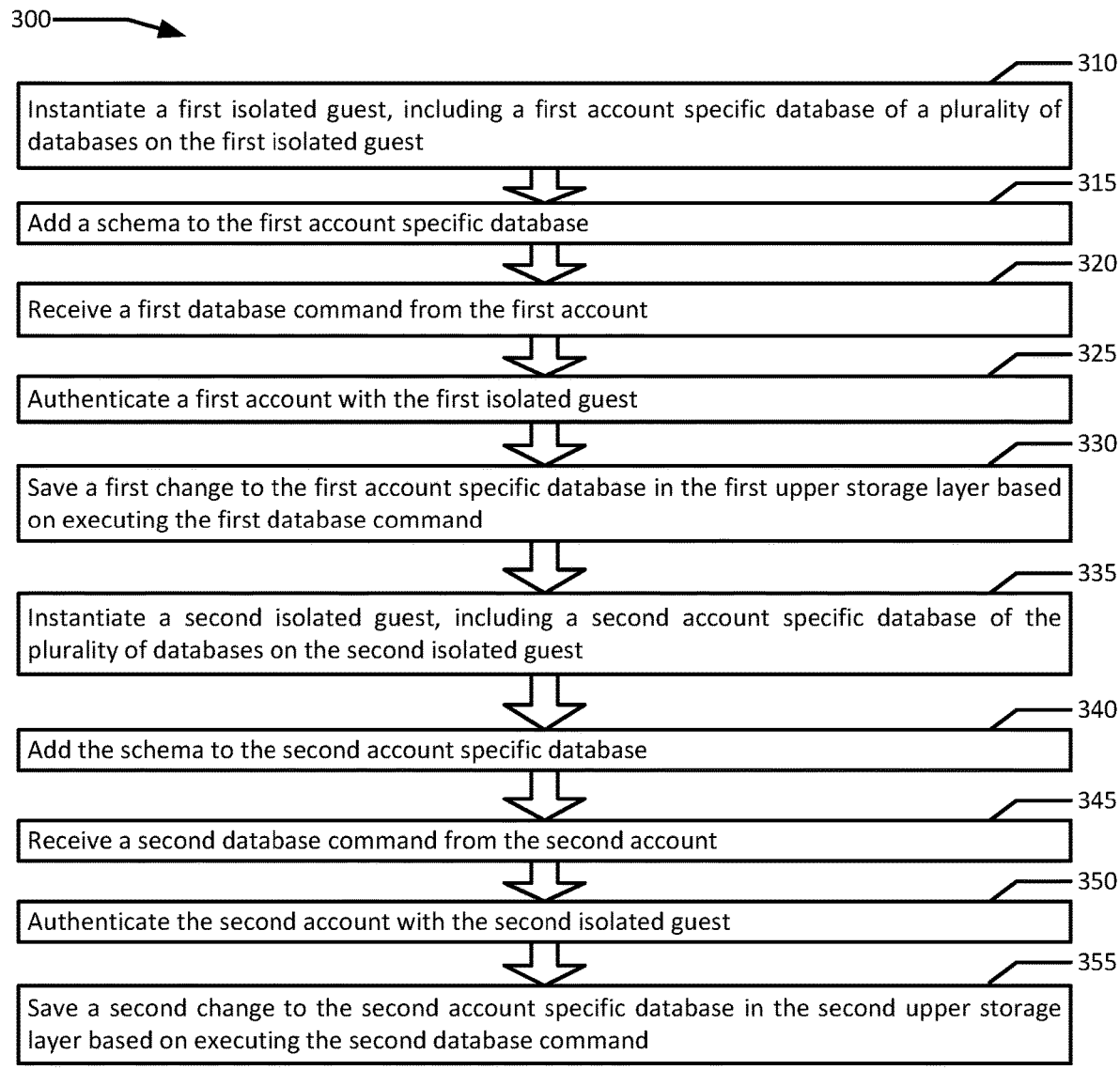
FIG. 3 is a flowchart illustrating an example of secure containerized user specific isolated data storage according to an example of the present disclosure.

FIG. 3 is a flowchart illustrating an example of secure containerized user specific isolated data storage according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a scheduler 140 in conjunction with nodes 112 and 114.

Example method 300 may begin with instantiating a first isolated guest, including a first account specific database of a plurality of databases on the first isolated guest (block 310). The first isolated guest includes at least a first lower storage layer that is write-protected and a first upper storage layer. In an example, a client device 155 associated with an account 157 may connect to system 100 through network 105 to store data. For example, client device 155 may be a DNA sequencer in a genetics laboratory. In the example, client device 150 and account 152 may belong to a rival laboratory, where system 100 provides a cloud based data analysis platform. The owners of account 157 may be interested in having their data stored separately from account 152. Similarly, an e-commerce site may desire to limit the impact of potential security breaches by storing payment and customer identifying information separately for different customers. In an example, a request may come from client device 155 requesting data to be stored. In the example, DB schema provider 140 may receive the request either directly or by way of other applications. For example, authentication server 145 may authenticate account 157 against account data 148, where account data 148 may be a data store such as database, metadata, file, etc. that includes login credentials for authorized accounts. In an example, account data 148 may be stored remotely from authentication server 145. Upon authentication, authentication server 145 may attempt to connect client device 155 to an account specific database associated with account 157, and failing to do so, may notify DB schema provider 140 to launch a new ASDB for account 157. In the example, DB schema provider 140 may directly or through a scheduler, request node 112 to instantiate an isolated guest such as container 165 to host an ASDB 175 for account 157. In an example, instantiating container 160 includes creating a file system with lower storage layer 215 constructed from a copy of container image 295B, where the lower storage layer 215 is configured to be write-protected. In the example, account 157 and/or any application accounts accessing container 165 may be prevented from changing the contents of lower storage layer 215. An upper storage layer 225 may also be created in either guest memory 195A or a separate persistent storage (e.g., persistent storage 230). In an example, core database system files of ASDB 175 may be part of container image 295B in the lower storage layer 215 (e.g., database drivers), but the data stored in ASDB 175 may be in upper storage layer 225.

A schema is added to the first account specific database (block 315). In a typical example, the schema is write-protected. In an example, DB schema provider 140 adds a copy of a schema (e.g., schema 290B) to ASDB 175. In an example, schema 290B is configured to be write-protected. Schema 290B may be configured to be write protected by any suitable method. For example, schema 290B may be included in container image 295B and written to lower storage layer 215. In another example, schema 290B may be written on top of the image file in a separate lower storage layer 217 either before or after container 165 is instantiated, for example, by DB schema provider 140. In an example, schema 290B may even be written in upper storage layer 225 and may be flagged read-only. In an example, building schema 290B into container image 295B may save on startup time but may be relatively inflexible, requiring separate container images for every schema. Allowing DB schema provider 140 to dynamically add schema 290B to lower storage layer 217 may provide for significantly more flexibility while maintaining security, but perhaps at the cost of some startup latency. Allowing the schema 290B to be in upper storage layer 225 may provide the most flexibility, since the schema 290B may then theoretically be updated to a new version without requiring potentially reinstantiating container 165. However, allowing schema 290B to be updatable presents potential security risks caused by user driven changes to schema 290B, for example, if a user introduces a schema that is non-compliant with applications accessing ASDB 175. In an example, a schema checking engine may execute on container 165 to validate the consistency of schema 290B. For example, when DB schema provider 140 provides a copy of schema 290B for container 165, either at the time of instantiation or later on as an update, DB schema provider 140 may hash the schema 290B first resulting in a canonical hash. The schema checking engine may then be configured to periodically hash schema 290B on ASDB 175 on container 165 resulting in a verification hash. The canonical hash may be periodically compared with the verification hash, and an error including an alert may be triggered based on a mismatch between the canonical hash and the verification hash. For purposes of this verification process, a suitable hash algorithm may be selected based on security and performance requirements. The canonical hash may be updated any time schema 290B is updated. In an example, ASDB 175 may be configured such that account 157 may update schema 290B. In such an example, a schema checking engine may hash the updated schema 290B provided by, for example, account 157, to update the canonical hash after the changes are committed.

A first database command is received from the first account (block 320). In an example, account 157 sends a first database command (e.g., CREATE, DELETE, DROP, INSERT, JOIN, ORDER, SELECT, UNION, UPDATE, etc.) to ASDB 175. In an example, the database command may originate directly from a Structured Query Language ("SQL") statement from client device 155. In another example, the database command may originate from an application that client device 155 is accessing, for example, an e-commerce site or a e-mail application requiring database storage. In an example, the first database command may be the trigger for instantiating ASDB 175 and container 165. In the example, DB schema provider 140 may forward the first command to ASDB 175 after ASDB 175 is instantiated.

A first account is authenticated with the first isolated guest (block 325). In an example, account 157 accessing ASDB 175 on container 165 may first authenticate with authentication server 145. In an example, account 157 may utilize a secure and/or encrypted connection to authenticate with container 165, for example, Secure Socket Layer ("SSL"). In some examples, authentication may be established once per continuous access session. In a more secure environment, authentication may be requested and/or required, for example, on a per command basis.

A first change is saved to the first account specific database in the first upper storage layer based on executing the first database command (block 330). In an example, ASDB 175 saves a change to the contents of ASDB 175 on the upper storage layer 210. For example, an INSERT command may add new data, or a DELETE command may remove data. In an example, ASDB 175 may be periodically backed up to DB content backup 275 on backup DB 125 in secure network 107.

A second isolated guest is instantiated, including a second account specific database of the plurality of databases on the second isolated guest (block 335). The second isolated guest includes at least a second lower storage layer that is write-protected and a second upper storage layer. In an example, container 160 is instantiated with upper storage layer 220 and write-protected lower storage layer 210 on guest memory 195A. In the example, container image 295A may be a second copy of container image 295B. In an example, lower storage layer 215 and lower storage layer 210 may be copy-on-write versions of the same lower storage layer on guest memory 195A, and may therefore only occupy disc space once in guest memory 195A. In an example, ASDB 170 is included in upper storage layer 220. In an example, ASDB 170 may be created in response to a new second account (e.g., account 152) accessing the same application as account 157. DB schema provider 140 may direct the creation of ASDB 170 to provide account 152 with a secure data store.

The schema is added to the second account specific database (block 340). In a typical example, the schema is write-protected. In an example, schema 290A is added to ASDB 170, and schema 290A is write-protected, for example, by being added to lower storage layer 210. In an example, lower storage layer 210 is interchangeable with lower storage layer 215 plus lower storage layer 217. In the example, the distinguishing features, including the respective associated accounts, between containers 160 and 165 may be stored in upper storage layers 220 and 225 respectively.

A second database command is received from the second account (block 345). In an example, account 152 sends a command to ASDB 170. In the example, account 152 may first be required to authenticate with authentication server 145. Therefore, the second account is authenticated with the second isolated guest (block 350). In an example, authentication server 145 manages the authentication process between container 160 and account 152 on client device 150. After authentication, account 152 may execute commands on ASDB 170. A second change is saved to the second account specific database in the second upper storage layer based on executing the second database command (block 355). For example, account 152 may issue an INSERT command with new credit card information, which is saved to ASDB 170 in upper storage layer 220 based on executing the INSERT command.

Figure 4:
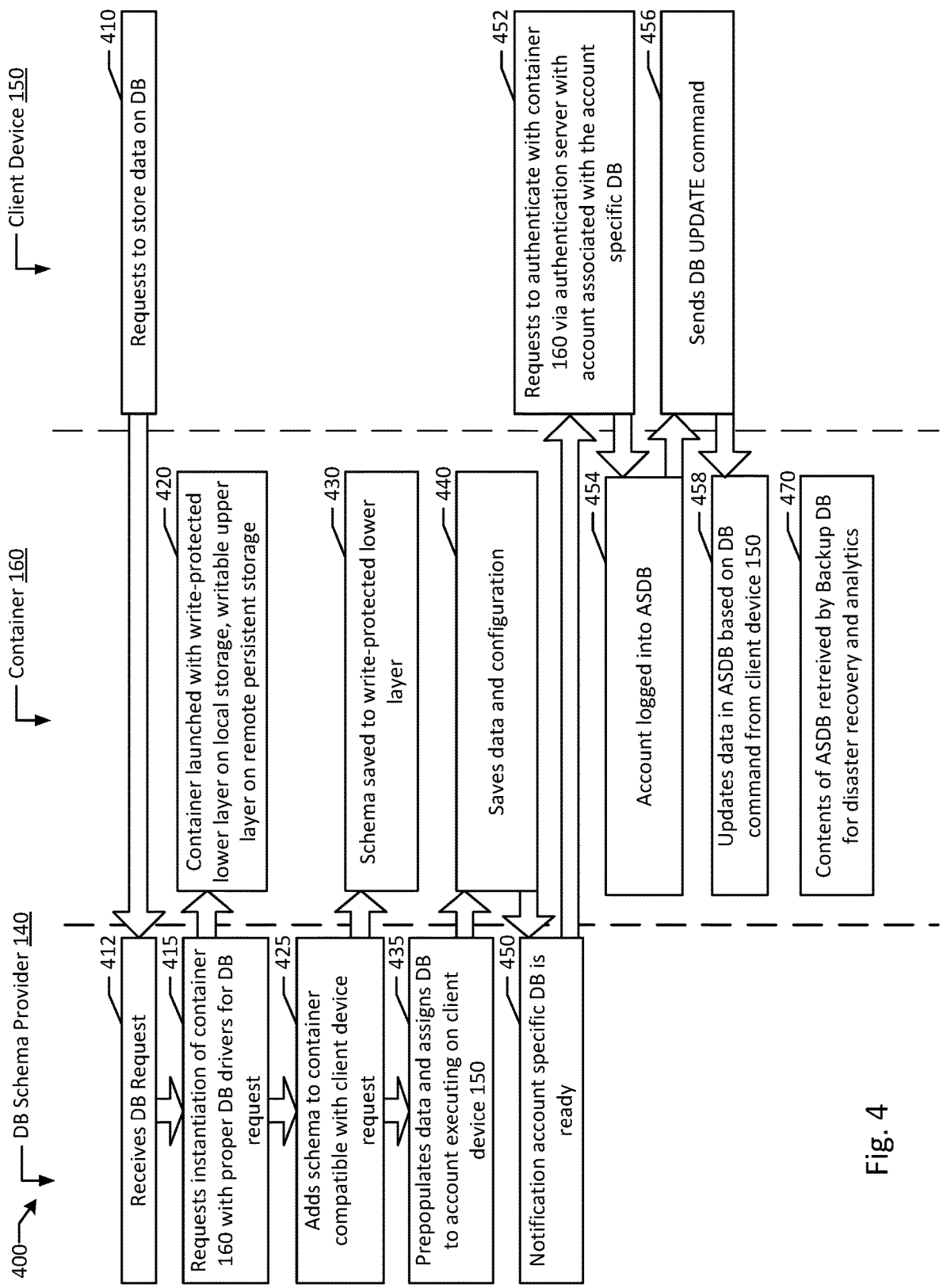
FIG. 4 is flow diagram of an example of secure containerized user specific isolated data storage according to an example of the present disclosure.

FIG. 4 is flow diagram of an example of secure containerized user specific isolated data storage according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, DB schema provider 140 executes to containerize a user specific isolated data storage in a container 160 for a client device 150.

In example system 400, client device 150 requests to store data on a database (block 410). For example, an account 152 may be logged in on client device 150 to buy books, and account 152 may add a book to a shopping cart. DB schema provider 140 receives the database request (block 412). In an example, DB schema provider 140 receives the database request by way of another application (e.g., a shopping cart application associated with DB schema provider 140). In an example, account 152 does not yet have a data store provisioned with a persistent shopping cart that will persist past logout. In the example, DB schema provider 140 requests the instantiation of container 160 with proper database drivers for the database request (block 415). For example, a container image with database drivers compatible with the shopping cart application is selected. In the example, container 160 is launched with a write protected lower storage layer 210 on guest memory 195A and a writeable upper storage layer 220 on remote persistent storage 230 (block 420). In an example, DB schema provider 140 adds schema 290A to container 160, compatible with the request to add items to a shopping cart from client device 150 (block 425). Schema 290A is then saved by container 160 to the write-protected lower storage layer 210 (block 430).

DB schema provider 140 prepopulates data and assigns ASDB 170 to account 152 executing on client device 150 (block 435). In an example, DB schema provider 140 prepopulates data on ASDB 170 on container 160 prior to account 152 executing any database commands on ASDB 170. For example, baseline data may include account specific data for account 152 including settings to assign ASDB 170 to account 152. In an example, container 160 saves the data and configurations in upper storage layer 220 (block 440). DB schema provider 140 may then notify account 152 that ASDB 170 is ready for use (block 450). In an example, client device 150 requests to authenticate with container 160 via authentication server 145 with account 152 associated with ASDB 170 (block 452). Upon successful authentication, account 152 is logged into ASDB 170 (block 454). In an example, account 152's original command leading to the creation of ASDB 170 may have been an INSERT command to add a book to a shopping cart. In some examples, the INSERT command may be processed upon successful instantiation of ASDB 170. In another example, DB schema provider 140 may begin provisioning ASDB 170 as soon as account 152 is created to provide a more seamless user experience. In an example, account 152 on client device 150 sends a database UPDATE command to update the quantity of an item in the shopping cart from one to two (block 456). In an example, container 160 updates the data in ASDB 170 based on the database command from client device 150 (block 458). In an example, client device 150 may send another DELETE command that deletes an item from the shopping cart. In an example, authentication server 145 may require re-authentication of account 152 for the DELETE command.

In an example, account 152 may log out of the shopping site without completing a purchase. ASDB 170 may wait for account 152 to return to shopping in an active state for a period of time, for example, one hour. In an example, after 15 minutes, account 152 authenticates with container 160 again, resetting ASDB 170's timeout to one hour again. Another reset may be triggered by account 152 adding a new item to the shopping cart with a database INSERT command. In an example, after ASDB 170 reaches its full one hour sleep timeout, container 160 enters into a hibernation mode. While in hibernation, container 160 may have a current memory state saved to upper storage layer 220, container 160 may cease processing activity awaiting account 150's return. In an example, a hibernating container uses significantly less system resources than an active container. A timeout value may be found to best balance performance and compute density. For example, hardware that may support 200 active containers may support 150 active and 2,000 hibernating simultaneously. In an example, prior to entering into hibernation, backup DB 125 retrieves the contents of ASDB 170 to be stored as DB content backup 270 for disaster recovery and data analytics purposes (block 470). In an example, node 112 fails to restore container 160 from hibernation due to data corruption on guest memory 195A. In the example, node 112 may launch a new container with new copies of container image 295A and schema 290A. DB content backup 270 may then be restored into a new upper storage layer for the new container as a replacement ASDB for account 152.

In an example, a new user of client device 150 may request an account by sending requested user name and password information to authentication server 145. In the example, authentication server 145 may save the information in account data 148 for the new account (e.g., account 152). After account creation, authentication server 145 may notify DB schema provider 140 and/or a container scheduler to construct a container on node 112 to host an ASDB for account 152. The container scheduler may instruct node 112 to load a container image file (e.g., container image 295A) as a template from which container 160 may be launched. In an example, schema 290A may be included in container image 295A. In another example, schema 290A may be added after container 160 is launched. In an example, container 160 is launched with ASDB 170 assigned to account 152. In an example, all applications that require access to the data in ASDB 170, whether virtualized or not, may be located in a namespace exposed to client device 150, such that the application may function as a bridge between client device 150 and ASDB 170, establishing a direct, trusted, secure connection with ASDB 170 and another with client device 150. In an example, an application requesting data from ASDB 170 may request client device 150 to input a proper authentication sequence (e.g., username and password) which may be forwarded to container 160 by authentication server 145, container 160 being instructed to accept queries from the application. In another example, authentication server 145 may forward the authentication information to an application to be cached for direct authentication with container 160 during a particular user session of account 152. In an example requiring heightened security, ASDB 170 may be located in a namespace isolated from client device 150, where client device 150 may be unable to establish a direct connection to ASDB 170, for example, inside a DMZ, possibly in a colocated location.

Figure 5:
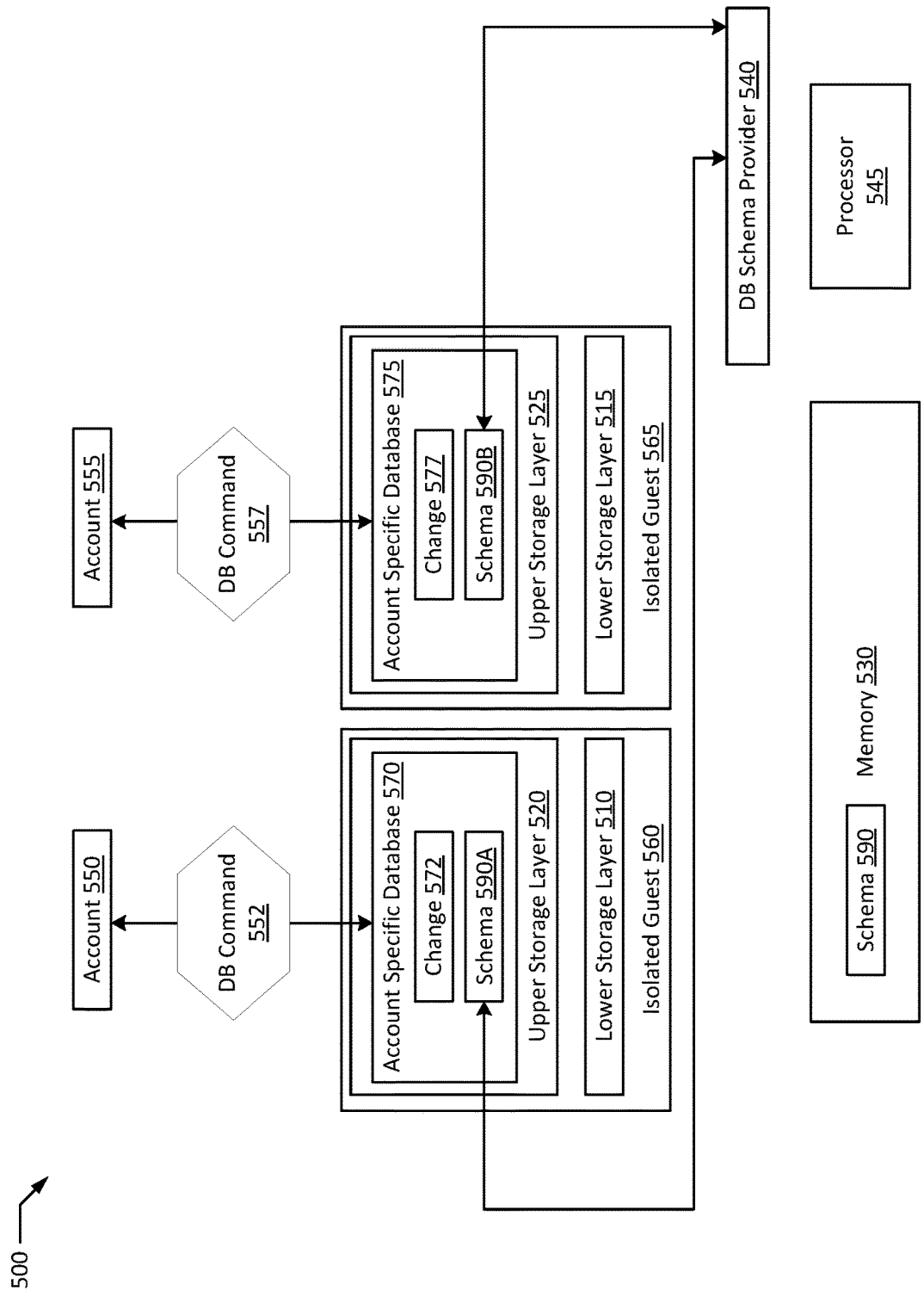
FIG. 5 is a block diagram of an example system for secure containerized user specific isolated data storage according to an example of the present disclosure.

FIG. 5 is a block diagram of an example system for secure containerized user specific isolated data storage according to an example of the present disclosure. Example system 500 includes memory 530, a processor 545, database schema provider 540, a schema 590 compatible with account specific databases 570 and 575. Accounts 550 and 555 access system 500. Processor 545 is communicatively coupled to memory 530, and processor 545 executes to instantiate a isolated guest 560, including ASDB 570. Isolated guest 560 includes lower storage layer 510 that is write-protected and upper storage layer 520. Schema 590A is a copy of schema 590 added to ASDB 570, and schema 590A is write-protected. Database command 552 is received from account 550. Account 550 is authenticated with isolated guest 560. Change 572 is saved to ASDB 570 in upper storage layer 520 based on executing database command 552.

Processor 545 executes to instantiate a isolated guest 565, including ASDB 575. Isolated guest 565 includes lower storage layer 515 that is write-protected and upper storage layer 525. Schema 590B is a copy of schema 590 added to ASDB 575, and schema 590B is write-protected. Database command 557 is received from account 555. Account 555 is authenticated with isolated guest 565. Change 577 is saved to ASDB 570 in upper storage layer 525 based on executing database command 557.

In an example, secure containerized user specific isolated data storage provides significant data security advantages for network data storage while incurring limited increases to processing overhead due to virtualization costs. For example, since each account's data is stored on a separate container and a separate database instance, there is very limited risk that a security breach of any one user account would expand to a wider leak in data. In many cases, virtualization costs may also be offset by being able to hibernate account specific database containers. For example, a centralized database storing account specific data for 2000 users may be in constant operation and may constantly incur operational overhead in terms of processing time spent seeking data in the large database. However, if only 50 users log in on average at any given time, up to 1950 of 2000 account specific databases may be hibernating at any given time, and seeking data within each small account specific database should be significantly faster than seeking for the same data in one large database with records for all 2000 accounts. For example, an account specific database may include five credit card numbers for an account, while a general payment database may include 10,000 credit card numbers for 2000 accounts to be parsed through for the same five credit card numbers to be returned as a result. Therefore, depending on usage rates, a net gain in processing efficiency may be realized as well. In addition, database locks and contention on a large database may be avoided by running numerous ASDBs in parallel. Overall database operational efficiency may well be significantly higher in the ASDB model. Through leveraging multi-layer file systems and copy-on-write memory management between many similar containers, very little additional processor and memory overhead may be incurred running 2000 containerized databases on one hardware node vs. one database serving 2000 accounts, while providing the above discussed security advantages.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of instantiating secure databases, the system comprising:
   a memory;
   a database schema provider;
   a schema compatible with a plurality of databases;
   a plurality of accounts, including a first account and a different second account; and
   one or more processors communicatively coupled to the memory wherein the one or more processors:
   instantiate a first isolated guest, including a first account specific database of the plurality of databases on the first isolated guest, wherein the first isolated guest includes at least a first lower storage layer that is write-protected and a first upper storage layer;
   add the schema to the first account specific database, wherein the schema is write-protected;
   receive a first database command from the first account directly or from a first application the first account is accessing;
   authenticate the first account with the first isolated guest by using first login credentials of the first account and first stored account data of the first account;
   save a first change to the first account specific database in the first upper storage layer based on executing the first database command;
   instantiate a second isolated guest, including a second account specific database of the plurality of databases on the second isolated guest, wherein the second isolated guest includes at least a second lower storage layer that is write-protected and a second upper storage layer;
   add the schema to the second account specific database, wherein the schema is write-protected;
   receive a second database command from the second account directly or from a second application the second account is accessing;
   authenticate the second account with the second isolated guest by using second login credentials of the second account and second stored account data of the second account; and
   save a second change to the second account specific database in the second upper storage layer based on executing the second database command.

2. The system of claim 1, wherein the first account and a third account both belong to a first group, and the third account executes a third database command on the first account specific database.

3. The system of claim 2, wherein the second account and the third account both belong to a second group, and the third account executes a fourth database command on the second account specific database.

4. The system of claim 1, wherein the first upper storage layer is on a persistent network storage device, and the first account specific database is restored on a third isolated guest based on the first upper storage layer.

5. The system of claim 1, wherein first contents of the first account specific database and second contents of the second account specific database are periodically saved to a backup database.

6. The system of claim 5, wherein the first contents are at least one of anonymized and encrypted prior to saving to the backup database.

7. The system of claim 5, wherein a batch analytics engine performs data analysis on data from multiple account specific databases including the first account specific database and the second account specific database via the backup database.

8. The system of claim 5, wherein the backup database is on a secure network without direct interfaces to unsecured networks.

9. The system of claim 5, wherein the first account specific database is restored on a third isolated guest with the first contents on the backup database.

10. The system of claim 1, wherein the first isolated guest is placed into hibernation after a sleep timeout elapses, wherein the sleep timeout is reset each time one of the first account authenticates with the first isolated guest and the first account specific database executes a third database command.

11. The system of claim 1, wherein the first account specific database is prepopulated with baseline data prior to the first account executing the first database command.

12. The system of claim 1, wherein the schema is hashed by the database schema provider resulting in a canonical hash, a schema checking engine executing on the first isolated guest hashes the schema on the first account specific database resulting in a verification hash.

13. The system of claim 12, wherein an alert is sent based on a mismatch between the canonical hash and the verification hash.

14. The system of claim 1, wherein the schema is saved to one of the first lower storage layer, a third lower storage layer of the first isolated guest that is write protected, and the first upper storage layer.

15. The system of claim 14, wherein the schema is updated and a schema checking engine hashes the schema resulting in a canonical hash of the updated schema, and then periodically hashes a current copy of the schema resulting in a verification hash, which is compared to the canonical hash.

16. The system of claim 1, wherein a third database command from the first account is executed on the first account specific database after authenticating the first account with the first isolated guest, wherein the third database command is different from the first database command.

17. A method of instantiating secure databases, the method comprising:
  instantiating a first isolated guest, including a first account specific database of a plurality of databases on the first isolated guest, wherein the first isolated guest includes at least a first lower storage layer that is write-protected and a first upper storage layer;
  adding a schema to the first account specific database, wherein the schema is write-protected;
  receiving a first database command from the first account directly or from a first application the first account is accessing;
  authenticating a first account with the first isolated guest by using first login credentials of the first account and first stored account data of the first account;
  saving a first change to the first account specific database in the first upper storage layer based on executing the first database command;
  instantiating a second isolated guest, including a second account specific database of the plurality of databases on the second isolated guest, wherein the second isolated guest includes at least a second lower storage layer that is write-protected and a second upper storage layer;
  adding the schema to the second account specific database, wherein the schema is write-protected;
  receiving a second database command from the second account directly or from a second application the second account is accessing;
  authenticating the second account with the second isolated guest by using second login credentials of the second account and second stored account data of the second account; and
  saving a second change to the second account specific database in the second upper storage layer based on executing the second database command.

18. The method of claim 17, wherein the first upper storage layer is on a persistent network storage device, and the first account specific database is restored on a third isolated guest based on the first upper storage layer.

19. The method of claim 17, wherein first contents of the first account specific database and second contents of the second account specific database are periodically saved to a backup database on a secure network without direct interfaces to unsecured networks, and a batch analytics engine performs data analysis on data from multiple account specific databases including the first account specific database and the second account specific database via the backup database.

20. A computer-readable non-transitory storage medium storing executable instructions of instantiating secure databases, which when executed by a computer system, cause the computer system to:
  instantiate a first isolated guest, including a first account specific database of a plurality of databases on the first isolated guest, wherein the first isolated guest includes at least a first lower storage layer that is write-protected and a first upper storage layer;
  add a schema to the first account specific database, wherein the schema is write-protected;
  receive a first database command from the first account directly or from a first application the first account is accessing;
  authenticate a first account with the first isolated guest by using first login credentials of the first account and first stored account data of the first account;
  save a first change to the first account specific database in the first upper storage layer based on executing the first database command;
  instantiate a second isolated guest, including a second account specific database of the plurality of databases on the second isolated guest, wherein the second isolated guest includes at least a second lower storage layer that is write-protected and a second upper storage layer;

add the schema to the second account specific database, wherein the schema is write-protected;

receive a second database command from the second account directly or from a second application the second account is accessing;

authenticate the second account with the second isolated guest by using second login credentials of the second account and second stored account data of the second account; and save a second change to the second account specific database in the second upper storage layer based on executing the second database command.

* * * * *